May 15, 1956     J. R. MONTGOMERY     2,745,914
CONTINUOUS ISSUE INTERLOCK
Filed July 30, 1953
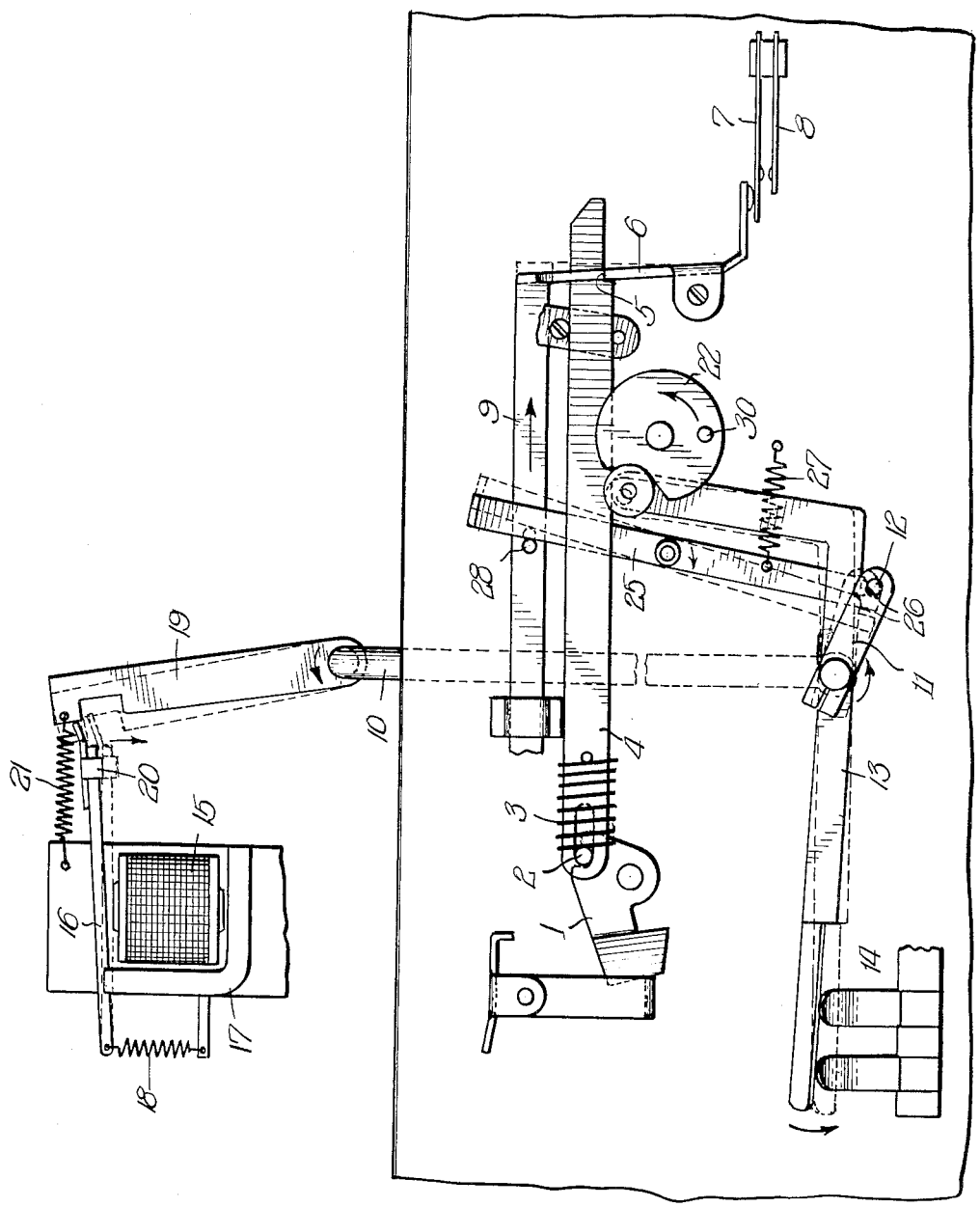
INVENTOR.
John R. Montgomery,
BY

United States Patent Office 2,745,914
Patented May 15, 1956

2,745,914
CONTINUOUS ISSUE INTERLOCK

John R. Montgomery, Chicago, Ill., assignor to American Totalisator Company, Inc., Baltimore, Md., a corporation of Maryland Application July 30, 1953, Serial No. 371,367

5 Claims. (Cl. 200—5)

This invention relates to machines for selectively printing and issuing tickets and has for its principal object the provision of a new and improved machine of this kind.

It is a main object of the invention to provide in a machine for selectively printing and issuing tickets a device for preventing repeated operations of the machine in response to the depressing of a key therein.

Another object of the invention is to provide a device for preventing repeat operations of a selective printing and issuing ticket machine, notwithstanding the failure of devices in that machine that normally function to bring the machine to rest at the end of a cycle of operation.

Another object of the invention is to provide a device for preventing repeat operations of a ticket machine, that can be added to an existing machine with a minimum of alterations thereof.

Another object of the invention is to provide a device for preventing repeat operations of a ticket machine, that can be installed on the machine and maintained in proper operating condition at low cost.

Further objects of the invention not specifically mentioned here will be apparent from the description and claims which follow, reference being had to the accompanying drawing in which a preferred embodiment of the invention is shown by way of example.

The single figure of the drawing shows the continuous issue interlock, together with a diagrammatic showing of the parts of a ticket machine associated with the interlock.

Machines for selectively printing and issuing tickets of the type shown in Patent 1,886,626, issued to Black, November 8, 1932, contain a plurality of keys and responsive to the depressing of one of those keys the machine operates through a cycle thereby to print a ticket bearing a number corresponding to the number of the depressed key and to issue that ticket. Mechanisms within the machine function to bring it to rest in its normal position at the end of the cycle.

When such a machine is used in conjunction with a totalizator system in which the issuance of the ticket is registered in an adding machine corresponding to the depressed key and also in an adding machine common to all keys, depressing of the key effects closing of electrical circuits over which these registrations take place, and when the registrations are completed an electrical pulse is sent back to the ticket machine to set it in motion to print and issue the ticket.

It occasionally happens that through faults in the electrical circuits or in the mechanical devices of the ticket machine, the machine will repeat and issue several tickets only one of which has been registered in the adding machines. Obviously such a contingency throws the system out of balance since there are a number of unregistered tickets issued. It is to the prevention of contingencies of this kind that the present invention is particularly concerned.

In ticket machines of the type shown in the above patent, a start bar is moved longitudinally responsive to the depressing of a key thereby to close an electrical circuit over which the registrations of the ticket to be issued are made, and also a second bar is moved simultaneously with the start bar to condition the machine for operation. Within the machine is an electromagnet energized by the completion of the registrations of the ticket to cause rotation of a shaft thereby to effect the closing of the circuit to the motor of the machine to start that motor which drives the machine through its cycle. Attached to this shaft is a bell crank, and in order to prevent a repeat operation of the machine, notwithstanding the failure of electrical or mechanical devices that normally control the machine, I have provided a latching means actuated by the longitudinal movement of the second bar to clear the path of the bell crank thereby to permit it to function to start the machine.

During the cycle of the machine, the start bar and second bar are returned to normal, and with them the latching means is moved into position to block the movement of the bell crank so that at the completion of the cycle, when the circuit to the motor is opened by cams driven by that motor, it cannot be re-closed until the start bar is re-operated to effect the registrations of a ticket. With this arrangement, even though there be failures of devices normally functioning to bring the machine to rest, it will nevertheless be brought to rest at the end of the cycle in a positive manner.

Referring now to the drawing in more detail, the depressing of a key moves a latch arm 1 in a clockwise direction around its pivot thereby moving pin 2 to tension a spring 3 which ultimately moves the start bar 4 to the right. The manner in which the keys of the machine are coupled to arm 1 forms no part of the present invention and reference is here made to my co-pending application, Serial No. 364,165, filed June 25, 1953, wherein those details may be found. A shoulder 5 on start bar 4 engages the start switch lever 6 and upon movement of the start bar to the right operates this lever 6 to close spring 7 against its make contact 8 thereby to close the circuit over which registrations of the ticket to be issued is effected. Attached to the start switch lever 6 is a longitudinally movable bar 9 through the operation of which the machine is conditioned for operation in the manner pointed out in the above mentioned Black patent.

Mounted in the end plates of the machine and extending therebetween is a shaft 10 to which a bell crank 11 is fixed. This bell crank carries a pin 12 which projects under switch arm 13 so that movement of the shaft 10 counterclockwise, as indicated by the arrow, will elevate this pin 12 and thereby operate the switch arm 13 to close the motor circuit switch 14 in the obvious manner. Mounted upon the side plate of the machine is an electromagnet 15 having an armature 16 pivotally mounted upon the heel piece 17 of the magnet. A spring 18 retains the armature 16 in its normal position. Fixed upon the shaft 10 is a notched lever 19, the end of which is normally held against a stop 20 on the armature 16 by a spring 21.

As soon as registrations of the ticket in the adding machines have been completed, magnet 15 is energized preferably in the manner pointed out in Patent 2,182,875, issued to Levy December 12, 1939, whereupon armature 16 is drawn down against the core of the magnet and stop 20 is moved into registration with the notch in lever 19. This permits spring 21 to pull lever 19 to the left thereby rotating shaft 10 counterclockwise to close the switch 14 as above. The motor being thus started drives the machine and rotates cam 22 counterclockwise, as indicated by the arrow, thereby to maintain the switch arm 13 in its operative position independently of the pin 12 throughout a cycle of operations of the machine.

The circuit of magnet 15 is closed but momentarily and that magnet soon de-energizes and releases its armature 16. During the cycle of operation of the machine, lever 19 is rotated in a clockwise direction by mechanism in the machine forming no part of the present invention, and spring 18 restores armature 16 to normal thereby replacing stop 20 in the path of lever 19 to prevent re-operation of that lever until magnet 15 is again operated.

Pivotally mounted upon the end plate of the machine is a latch 25 at the lower end of which is a shoulder 26 that is positioned in the path of pin 12 when the lever 25 is in its normal position in which it is shown in full lines. A spring 27 maintains this lever in normal position. Mounted upon the bar 9 is a pin 28 that bears against the lever 25 so that when the bar 9 is moved to the right as above, latch 25 will be rotated counterclockwise into the position in which it is shown in dotted lines, in which position shoulder 26 is moved out of the path of pin 12.

During the cycle of operation of the machine, rotation of the cam 22 moves the pin 30 into engagement with the start lever 4, thereby elevating that lever to disengage shoulder 5 from the start switch lever 6, thereby to permit the tension of spring 7 to restore the lever 6 to its normal position. Bar 9 is thus moved to the left permitting spring 27 to restore latch 25 into the position in which it blocks upward movement of the pin 12.

In the event of a faulty electrical circuit resulting in maintaining magnet 15 energized throughout the cycle of the machine, or failure of spring 18 to restore the armature 16 to normal position, were it not for the shoulder 26 on latch 25 locking the upward movement of pin 12, spring 21 could re-operate lever 19 and thereby initiate a new cycle of operation of the machine, notwithstanding that spring 7 would not be re-operated into engagement with its make contact 8 and the issuance of a second ticket therefore would not be registered in the adding machines. Since shoulder 26 blocks the path of pin 12 at all times, except when the start bar has moved switch arm 6 to close spring 7 against its make contact 8, latch 25 definitely prevents the issuance of tickets which have not been registered in the adding machines.

The device of the present invention can be installed upon existing ticket machines of the aforementioned type at low cost and maintained in proper operating condition with a minimum of servicing. It definitely prevents repeat operations of the machine and consequently prevents the issuance of tickets which have not been properly registered in the adding machine.

While I have chosen to illustrate my invention by showing and describing a preferred embodiment of it, I have done so by way of example only, as there are many modifications and adaptations which can be made by one skilled in the art within the teachings of the invention.

Having thus complied with the statutes and shown and described a preferred embodiment of my invention, what I consider new and desire to have protected by Letters Patent is pointed out in the appended claims.

What is claimed is:

1. In a machine for selectively printing and issuing tickets; a start switch; a bar moved longitudinally to operate said start switch to initiate an operation of the machine; a shaft; a bell crank fixed on said shaft; a motor switch; means for rotating said shaft thereby to move said bell crank to close said motor switch; a pivoted latch; a shoulder on said latch normally blocking movement of said bell crank; and a bar controlled by said start switch for moving said latch thereby to move said shoulder out of the path of said bell crank when the start switch is in operated position thereby to permit movement of the bell crank to close said motor switch.

2. In a machine for selectively printing and issuing tickets; a start switch; means for moving said start switch from normal to operated position to initiate a cycle of operation of the machine and for maintaining the switch closed during a portion of the cycle; a motor switch; means for closing said motor switch to operate the machine through a cycle; cam means for maintaining said motor switch closed independently of said means for closing the switch; and latch means connected to and operated by said start switch for preventing an operation of the means for closing the motor switch except when the start switch is in its operated position.

3. In a machine for selectively printing and issuing tickets; a start switch; a bar moved longitudinally to operate said start switch to initiate an operation of the machine; a second bar connected to the start switch and moved longitudinally by an operation thereof; a shaft; a bell crank upon said shaft; a motor switch; means for rotating said shaft thereby to rotate said bell crank to operate said motor switch; a pin on said second bar; a pivoted latch engaging said pin; a shoulder upon said latch normally blocking movement of said bell crank, said shoulder being moved out of the path of said bell crank by said pin during said longitudinal movement of said second bar thereby to permit rotation of the bell crank to operate said motor switch.

4. In a machine for selectively printing and issuing tickets; a motor switch; a rotatable shaft; a bell crank fixed on said shaft and engaging said motor switch to operate the same to closed position as the shaft rotates; a notched lever fixed upon said shaft; a spring attached to said lever and tensioned to move the lever and thereby rotate said shaft; an electromagnet; an armature on said magnet; a stop on said armature normally engaging said lever to prevent said spring from moving it, said stop moving into the notch in the lever upon energization of the magnet thereby to permit movement of the lever under the influence of said spring; a start switch; means for moving said start switch from normal to operated position; a latch; a shoulder on said latch normally blocking movement of the bell crank to operate said motor switch; and a bar connected to and operated by said start switch moving to operated position for operating said latch to remove said shoulder from blocking position thereby to permit closing the motor switch only when said start switch and said electromagnet are simultaneously in operated position.

5. In a machine for selectively printing and issuing tickets; a start switch; a longitudinally movable bar; a shoulder on said bar engaging said start switch to cause longitudinal movement of the bar to operate the switch to initiate an operation of the machine; a motor switch; a shaft; a crank arm fixed on said shaft; means for rotating said shaft thereby to move said crank arm to close said motor switch; cam means for maintaining said motor switch closed independently of said crank arm which is returned to its normal position during an operation of the machine; a pivoted latch; a shoulder on said latch normally blocking movement of said crank arm in the direction to operate said motor switch; means for moving said latch shoulder out of blocking position as said start switch moves to its operated position; means on said cam means for moving the shoulder on said bar out of engagement with said start switch during the operation of said machine, said start switch restoring to normal and said latch shoulder being returned thereby to blocking position to prevent further movement of said crank arm until said start switch is again operated.

References Cited in the file of this patent

UNITED STATES PATENTS 2,020,594    Webb  ---------------- Nov. 12, 1935